(12) United States Patent
Ran (10) Patent No.: US 11,776,571 B1
(45) Date of Patent: Oct. 3, 2023

(54) SEGMENTED FRONT BAR FOR PARTICLE ROBUSTNESS

(71) Applicant: Western Digital Technologies, Inc., San Jose, CA (US)

(72) Inventor: Xiaojuan Ran, Shenzhen (CN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/660,878

(22) Filed: Apr. 27, 2022

(51) Int. Cl.
*G11B 5/60* (2006.01)
*G11B 5/40* (2006.01)
*G11B 33/14* (2006.01)
*G11B 5/127* (2006.01)

(52) U.S. Cl.
CPC .......... *G11B 5/6082* (2013.01); *G11B 5/1272* (2013.01); *G11B 5/40* (2013.01); *G11B 33/1446* (2013.01)

(58) Field of Classification Search
None
See application file for complete search history.

(56) References Cited

U.S. PATENT DOCUMENTS

| | | | |
|---|---|---|---|
| 6,392,842 B1 * | 5/2002 | Boutaghou | G11B 5/6005 360/235.8 |
| 6,920,015 B2 | 7/2005 | Mundt et al. | |
| 7,423,843 B2 * | 9/2008 | Takahashi | G11B 5/6005 |
| 8,199,437 B1 | 6/2012 | Sun et al. | |
| 9,190,089 B1 | 11/2015 | Zhang | |
| 10,354,685 B1 | 7/2019 | Hu et al. | |
| 10,811,046 B2 | 10/2020 | Pan et al. | |
| 11,587,584 B1 * | 2/2023 | Hu | G11B 5/60 |
| 2002/0063994 A1 * | 5/2002 | Ueda | G11B 5/6005 360/235.8 |
| 2002/0097524 A1 * | 7/2002 | Tokuyama | G11B 5/60 360/236.6 |
| 2002/0163762 A1 * | 11/2002 | Levi | G11B 5/6005 216/2 |
| 2003/0107842 A1 * | 6/2003 | Sasaki | G11B 5/6082 360/235.8 |

(Continued)

OTHER PUBLICATIONS

Junguo Xu, Hiromitsu Tokisue, and Youichi Kawakubo, "Study on Soft-Particle Intrusion in a Head/Disk Interface of Load/Unload Drives," IEEE Transactions on Magnetics, vol. 36, No. 5, Sep. 2000.

*Primary Examiner* — Peter Vincent Agustin (57) ABSTRACT

Disclosed herein are sliders with segmented front bars, methods of manufacturing them, and data storage devices comprising them. In some embodiments, a slider comprises a segmented front bar, a leading pad, a shallow-edge surface, and a cavity. The segmented front bar includes a plurality of slots situated substantially perpendicular to the leading-edge surface of the slider. The leading pad is situated between the leading-edge surface of the slider and a trailing edge of the slider and is recessed from the segmented front bar. The cavity abuts the segmented front bar and is situated between the segmented front bar and the leading pad. The shallow-etch surface is situated between the cavity and the leading pad. A maximum depth of the plurality of slots relative to a non-recessed surface of the segmented front bar is less than a depth of the cavity relative to the non-recessed surface of the segmented front bar.

19 Claims, 6 Drawing Sheets

(56) References Cited

U.S. PATENT DOCUMENTS

| | | | |
|---|---|---|---|
| 2003/0165031 A1 | 9/2003 | Rajakumar | |
| 2003/0227717 A1* | 12/2003 | Cha | G11B 5/6005 |
| 2004/0075947 A1* | 4/2004 | Ohwe | G11B 5/6005 |
| | | | 360/235.8 |
| 2011/0096441 A1 | 4/2011 | Kunkel et al. | |

* cited by examiner

SEGMENTED FRONT BAR FOR PARTICLE ROBUSTNESS

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Many data storage devices, such as hard disk drives, are operated in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment, and to prevent the helium from escaping from the interior of the data storage device. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to data storage devices, however. For example, when operating in helium or a helium mixture, rather than air, the surface of the recording medium can be more susceptible to particle scratches due to reduced particle mobility (because of less pressure gradient and less shear). Particles, lube pick-up, contaminants, and/or smear can build up on the ABS and damage the recording media or cause data stored on the media to be erased. Thus, there is an ongoing need for sliders designs that provide improved particle robustness without sacrificing flight characteristics.

SUMMARY

This summary represents non-limiting embodiments of the disclosure.

In some aspects, the techniques described herein relate to a slider, including: a plurality of media-facing surfaces at a plurality of levels, the plurality of levels including a first level, a second level, and a third level, wherein, in an orientation in which the plurality of media-facing surfaces is oriented upward, the first level is above the second level, and the second level is above the third level; a segmented front bar including a leading-edge surface, a segmented media-facing surface, and a cavity-facing surface; and at least one cavity abutting the segmented front bar and situated between the cavity-facing surface of the segmented front bar and a leading pad, wherein: the segmented media-facing surface includes a plurality of non-recessed portions at the first level and a plurality of recessed portions at the second level, and a floor of the at least one cavity is at the third level.

In some aspects, the techniques described herein relate to a slider, wherein: the second level is recessed from the first level by between approximately 100 nm and approximately 1000 nm, and the third level is recessed from the first level by between approximately 2000 nm and approximately 4000 nm.

In some aspects, the techniques described herein relate to a slider, wherein a number of the plurality of non-recessed portions is between about 6 and about 40.

In some aspects, the techniques described herein relate to a slider, wherein a number of the plurality of recessed portions is between about 5 and about 41.

In some aspects, the techniques described herein relate to a slider, further including: a first side-edge surface substantially perpendicular to the leading-edge surface; and a second side-edge surface substantially parallel to the first side-edge surface, and wherein the at least one cavity includes: a first cavity open to the first side-edge surface, and a second cavity open to the second side-edge surface.

In some aspects, the techniques described herein relate to a slider, wherein a thickness of the segmented front bar is between approximately 10 microns and approximately 50 microns.

In some aspects, the techniques described herein relate to a slider, further including: a shallow-etch surface adjacent to the at least one cavity, wherein the shallow-etch surface is substantially perpendicular to the leading-edge surface and is at the second level.

In some aspects, the techniques described herein relate to a data storage device including: a recording media, and the slider described above.

In some aspects, the techniques described herein relate to a method of making a slider, the method including: applying a first mask to a wafer, the first mask protecting a first plurality of locations corresponding to the plurality of non-recessed portions and not protecting (a) a second plurality of locations corresponding to the plurality of recessed portions, and (b) at least one location corresponding to the at least one cavity; removing material from the second plurality of locations corresponding to the plurality of recessed portions and from the at least one location corresponding to the at least one cavity; applying a second mask to the wafer, the second mask protecting the plurality of non-recessed portions and the plurality of recessed portions and not protecting the at least one location corresponding to the at least one cavity; and removing additional material from the at least one location corresponding to the at least one cavity.

In some aspects, the techniques described herein relate to a method, wherein: removing material from the second plurality of locations corresponding to the plurality of recessed portions and from the at least one location corresponding to the at least one cavity includes performing shallow ion milling; and removing additional material from the at least one location corresponding to the at least one cavity includes performing deep ion milling.

In some aspects, the techniques described herein relate to a slider, including: a segmented front bar including a plurality of slots, wherein a front surface of the segmented front bar is a leading-edge surface of the slider, and wherein the plurality of slots is situated substantially perpendicular to the leading-edge surface of the slider; a leading pad situated between the leading-edge surface of the slider and a trailing edge of the slider, wherein the leading pad is recessed from the segmented front bar; a cavity abutting the segmented front bar and situated between the segmented front bar and the leading pad; and a shallow-etch surface situated between the cavity and the leading pad, wherein a maximum depth of the plurality of slots, relative to a non-recessed surface of the segmented front bar, is less than a depth of the cavity relative to the non-recessed surface of the segmented front bar.

In some aspects, the techniques described herein relate to a slider, wherein all of the plurality of slots are substantially identical.

In some aspects, the techniques described herein relate to a slider, wherein a distance between adjacent slots is between approximately 10 microns and approximately 100 microns.

In some aspects, the techniques described herein relate to a slider, wherein, the maximum depth of the plurality of slots, relative to a media-facing surface of the segmented front bar, is substantially identical to a recess distance of the shallow-etch surface relative to a media-facing surface of the leading pad.

In some aspects, the techniques described herein relate to a slider, wherein, relative to a media-facing surface of the segmented front bar, the maximum depth of the plurality of slots is between approximately 100 nm and approximately 1000 nm.

In some aspects, the techniques described herein relate to a slider, wherein, relative to the media-facing surface of the segmented front bar, the depth of the cavity is between approximately 2000 nm and approximately 4000 nm.

In some aspects, the techniques described herein relate to a slider, wherein a thickness of the segmented front bar is between approximately 10 microns and approximately 50 microns.

In some aspects, the techniques described herein relate to a data storage device including: a recording media, and the slider described above.

In some aspects, the techniques described herein relate to a method of making a slider, the method including: applying a first mask to a wafer, the first mask not protecting (a) a plurality of locations corresponding to the plurality of slots, (b) at least one location corresponding to the cavity, and (c) an area corresponding to the shallow-etch surface; removing material from the plurality of locations corresponding to the plurality of slots, from the at least one location corresponding to the cavity, and from the area corresponding to the shallow-etch surface; applying a second mask to the wafer, the second mask protecting the plurality of locations corresponding to the plurality of slots and the area corresponding to the shallow-etch surface, and not protecting the at least one location corresponding to the cavity; and removing additional material from the at least one location corresponding to the cavity.

In some aspects, the techniques described herein relate to a method, wherein: removing material from the plurality of locations corresponding to the plurality of slots, from the at least one location corresponding to the cavity, and from the area corresponding to the shallow-etch surface includes performing shallow ion milling; and removing additional material from the at least one location corresponding to the cavity includes performing deep ion milling.

BRIEF DESCRIPTION OF THE DRAWINGS

Objects, features, and advantages of the disclosure will be readily apparent from the following description of certain embodiments taken in conjunction with the accompanying drawings in which.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are sliders that mitigate the deleterious effects of particles in data storage devices. The disclosed techniques may be used, for example, to improve the particle performance of data storage systems in lower-pressure atmospheres. Also disclosed are methods of making sliders providing improved particle robustness, and data storage devices comprising such sliders.

The disclosures herein can be used to improve the particle robustness of the slider and the data storage device by blocking particles at the slider leading edge while allowing sufficient air flow to maintain good flying and dynamic characteristics.

It is to be understood that the legacy terms "air-bearing surface" and "ABS" are used herein to refer to the media-facing surface of the slider regardless of whether the data storage device operates in air or in a lower-pressure atmosphere (e.g., in helium or another lighter-than-air gas).

Figure 1:
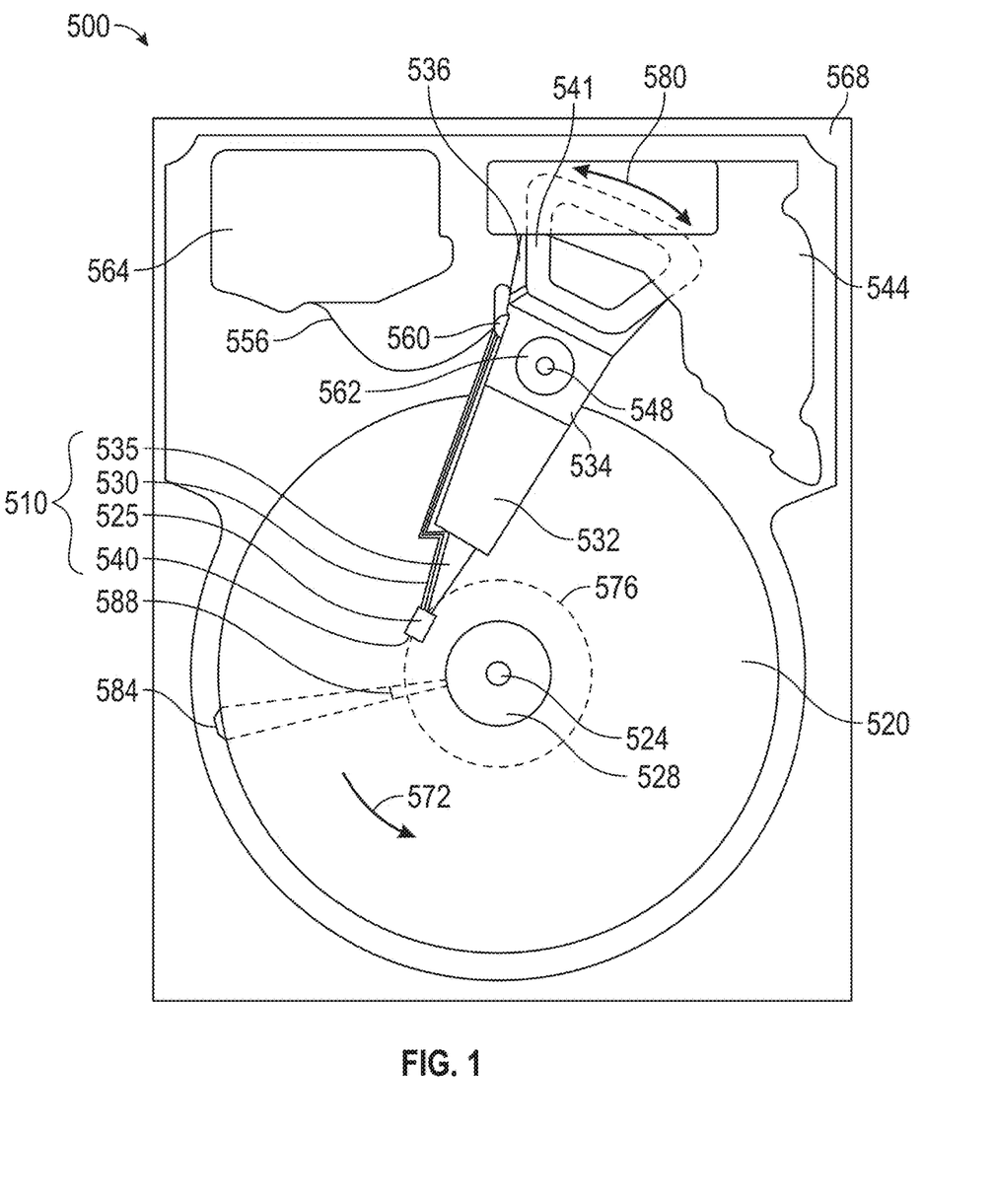
FIG. 1 is a plan view illustrating an example of a data storage device that may include one or more of the embodiments disclosed herein.

FIG. 1 is a plan view illustrating an example of a data storage device 500, illustrated as a hard disk drive, that may include one or more of the embodiments disclosed herein. FIG. 1 illustrates an example of the functional arrangement of components of the data storage device 500, including a slider 525 that includes a recording head 540. The recording head 540 (which may also be referred to herein as a transducer or a read/write transducer) includes a write element and a read element for respectively writing and reading information stored on a recording medium 520 of the data storage device 500. The data storage device 500 includes at least one head gimbal assembly (HGA) 510, which includes the slider 525, a suspension and actuator arm 530 attached to the slider 525, and a load beam 535 attached to the suspension and actuator arm 530. The data storage device 500 also includes at least one recording medium 520, which may be, for example, a magnetic recording medium, rotatably mounted on a spindle 524, and a drive motor (not shown) attached to the spindle 524 for rotating the recording medium 520. The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of an HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, the HSA is the assembly configured to move the slider 525 to enable the recording head 540 to access portions of the recording medium 520 (e.g., magnetic-recording disks) for read and write operations.

In accordance with some embodiments, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics (AE) module 560, which may have an on-board pre-amplifier for the read signal, as well as other read-channel and write-channel electronic components. The AE module 560 may be attached to the carriage 534 as shown. The flex cable 556 is coupled to an electrical-connector block 564, which provides electrical communication through electrical feed-throughs provided by a data storage device housing 568. The data storage device housing 568, in conjunction with a cover (not shown), provides a sealed, protective enclosure for the information storage components of the data storage device 500.

In accordance with some embodiments, other electronic components, including a disk controller and servo electronics such as a digital-signal processor (DSP), provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of air that acts as an air-bearing on which the air-bearing surface (ABS) of the slider 525 rides so that the slider 525 flies above the surface of the recording medium 520 without making contact with a thin magnetic-recording layer of the recording medium 520 in which information is recorded.

The electrical signal provided to the voice coil 541 of the VCM enables the recording head 540 of the HGA 510 to access a track 576 on which information is recorded. Thus, the armature 536 of the VCM swings through an arc 580, which enables the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data from the track 576 or writes data to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

The data storage device 500 may be what is at times referred to as a "hybrid drive." A hybrid drive refers generally to a storage device having functionality of both a traditional hard disk drive (HDD) combined with a solid-state storage device (SSD) using non-volatile memory, such as flash or other solid-state (e.g., integrated circuits) memory, which is electrically erasable and programmable. Because operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Furthermore, a hybrid drive may be architected and configured essentially as two storage devices in a single enclosure, e.g., a traditional HDD and a SSD, with either one or multiple interfaces for host connection.

Figure 2:
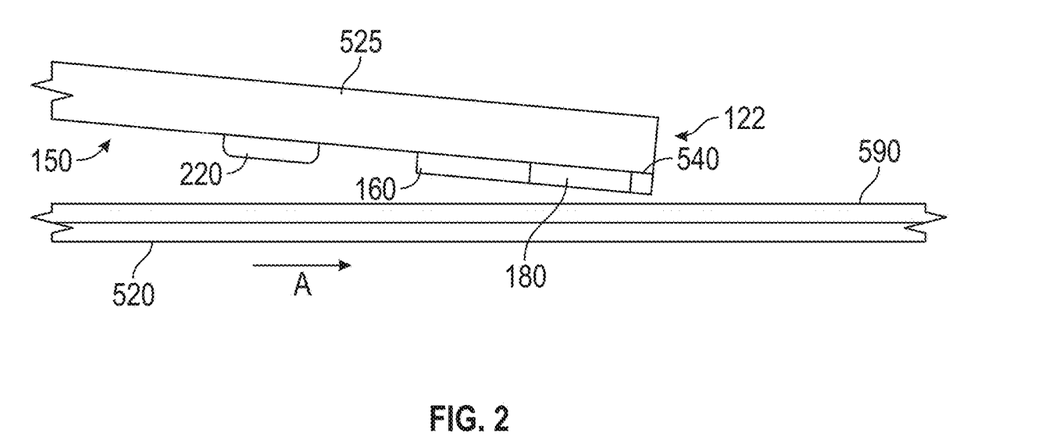
FIG. 2 is a side view of a slider and a recording medium of the data storage device shown in FIG. 1 in accordance with some embodiments.

FIG. 2 is a side view of the slider 525 and the recording medium 520 of the data storage device 500 shown in FIG. 1 in accordance with some embodiments. The slider 525 may include one or more of the embodiments disclosed herein. The recording medium 520 is moving in the direction of the arrow A and causes airflow in the same direction. This airflow flows over the ABS 150 of the slider 525 and produces the lifting pressure described above. In some embodiments, the slider 525 includes raised areas such as a leading pad 220, one or more side pads 160, and a trailing pad 180. The trailing pad 180, located adjacent to the trailing-edge surface 122 of the slider 525, may further include the recording head 540 that writes data to and reads data from the recording medium 520. The recording medium 520 has a lubricant 590 on its upper surface to protect the recording layer of the recording medium 520 from contact with the slider 525 and/or other components of the data storage device 500.

Particle build-up can be a significant problem for both data storage devices (e.g., hard disk drives) that operate in air and data storage devices that operate in lower-pressure-environments, such as sealed helium drives. The problem can be particularly acute in lower pressure environments. Particles tend to build up at the leading edge surface of the slider 525, particularly in areas close to the leading pad 220. These particles may touch the recording medium 520, which can result in damage to the recording medium 520. Some types of particles (e.g., harder particles such as diamond, alumina, TiC, etc.) are likely to scratch the recording medium 520 if they touch it. Other types of particles (e.g., softer particles such as silicon, stainless steel, lubricant 590, etc.) are less likely to cause detectable physical damage to the recording medium 520, but they can still cause recorded magnetic information to be erased because of thermal and/or mechanical stress.

To obtain good performance, particularly in a data storage device 500 filled with gas having lower-density than air (e.g., helium), it is desirable for the slider 525 to fly close to the surface of the recording medium 520. But as the distance between the slider 525 and the recording medium 520 decreases, the likelihood of particles damaging the recording medium 520 or erasing data increases. For example, in sealed helium hard disk drives, there is significantly less pressure gradient at the trailing edge of the slider 525, which causes little-to-no backflow at the trailing edge. The lower pressure gradient causes particles to be less mobile, which can lead to particle build-up. Consequently, it is desirable to mitigate the deleterious effects of particles in data storage devices 500, such as by blocking them at the leading edge. The disclosures herein can be used to improve the particle robustness of the slider 525 and the data storage device 500.

Figure 3A:
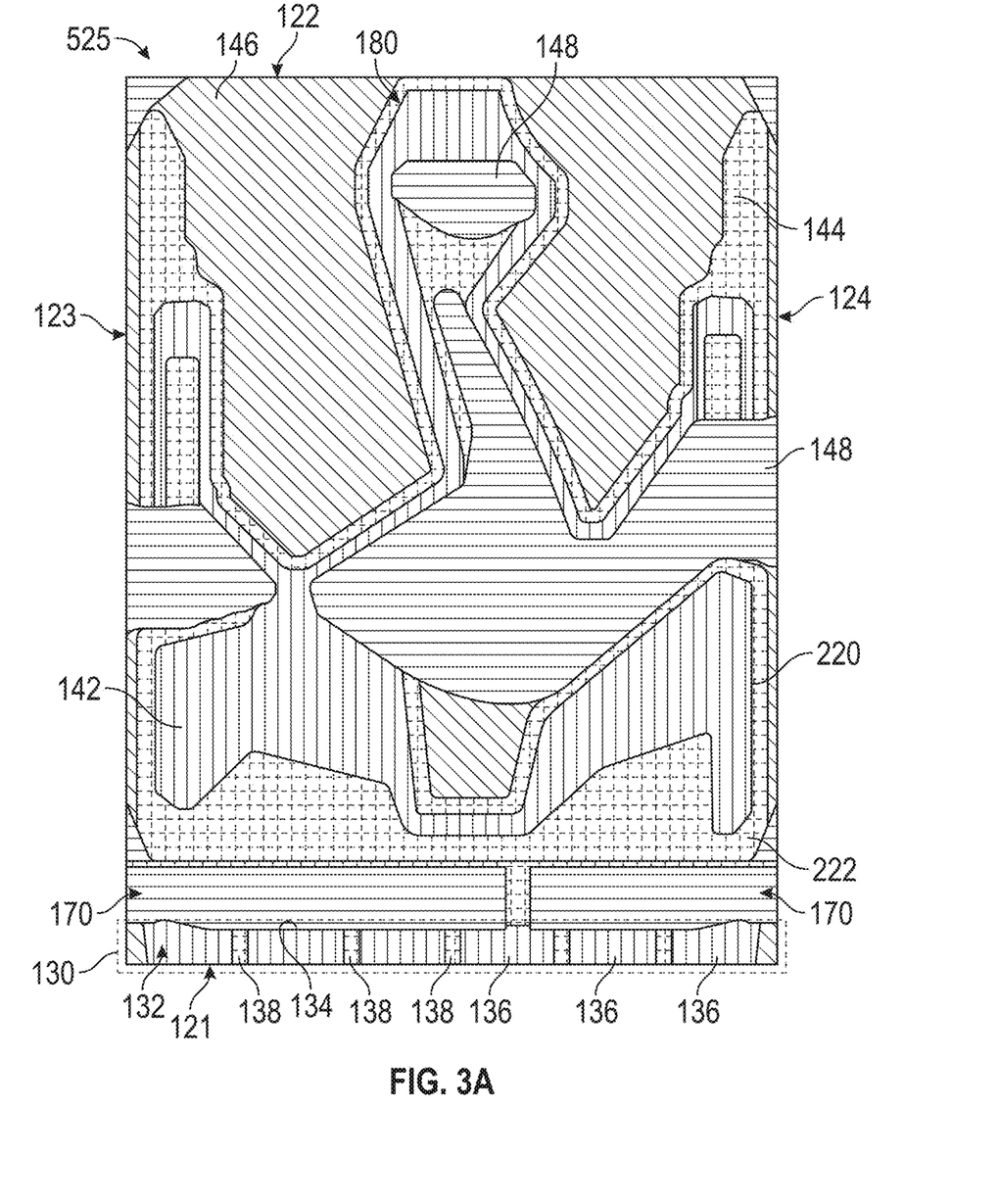
FIG. 3A is an ABS view of an example of a slider in accordance with some embodiments.
Figure 3B:
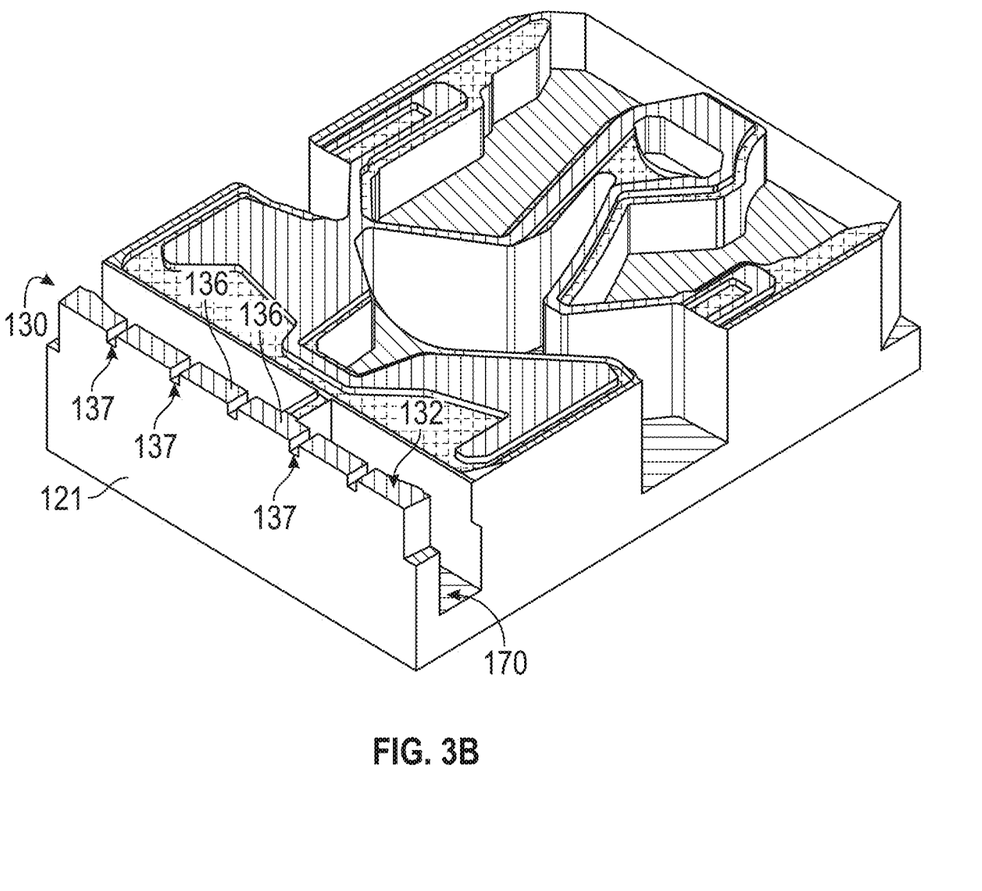
FIG. 3B is an isometric view of the slider shown in FIG. 3A.

FIG. 3A is an ABS view of an example of a slider 525 in accordance with some embodiments. FIG. 3B is an isometric view of the slider 525 shown in FIG. 3A. The slider 525 has a leading-edge surface 121, a trailing-edge surface 122 opposite and the leading-edge surface 121, a first side-edge surface 123 extending between the leading-edge surface 121 and the trailing-edge surface 122, and a second side-edge surface 124 opposite the first side-edge surface 123 and extending between the leading-edge surface 121 and the trailing-edge surface 122. As shown in FIG. 3A, the leading-edge surface 121 is substantially parallel to the trailing-edge surface 122 and is substantially perpendicular to both the first side-edge surface 123 and the second side-edge surface 124. Thus, the first side-edge surface 123 and second side-edge surface 124 are substantially parallel to each other.

The slider 525 also has a plurality of media-facing surfaces at a plurality of levels. In the example slider 525 shown in FIGS. 3A and 3B, there are surfaces at levels that include a first level 142, a second level 144, a third level 146, and a fourth level 148. The first level 142 is the level that will be closest to the recording medium 520 when the slider 525 is installed in a data storage device 500. The second level 144 is the level that is next closest to the surface of the recording medium 520 when the slider 525 is installed in a data storage device 500. The fourth level 148 is the level that is furthest from the surface of the recording medium 520 when the slider 525 is installed in a data storage device 500, and the third level 146 is between the second level 144 and the fourth level 148. Accordingly, in an orientation in which the plurality of media-facing surfaces is oriented upward, the first level 142 is above the second level 144, the second level is above the third level 146, and the third level 146 is above the fourth level 148.

The second level 144, third level 146, and fourth level 148 may be recessed from the first level 142 by any suitable distances. For example, the second level 144 may be recessed from the first level 142 by less than 0.2 microns, and/or the third level 146 may be recessed from the first level 142 by between about 0.1 microns and about 2 microns, and/or the fourth level 148 may be recessed from the first level 142 by between about 2 microns and about 4 microns. These recess distances are merely examples. It will be appreciated that they can be different than the examples given herein.

The slider 525 includes a leading pad 220 near the leading-edge surface 121 and situated between the leading-edge surface 121 and the trailing-edge surface 122. The leading pad 220 is recessed from the leading-edge surface 121. The leading pad 220 is also recessed from the segmented front bar 130 (i.e., the leading pad 220 is separated from the segmented front bar 130 by some distance in a direction perpendicular to the leading-edge surface 121 and the trailing-edge surface 122; in other words, viewed from the leading-edge surface 121, the leading pad 220 is behind the segmented front bar 130). The leading pad 220 has a media-facing surface at the first level 142.

The slider 525 also includes a trailing pad 180 near the trailing-edge surface 122 of the slider 525. Typically, the trailing pad 180 has a recording head 540 (not shown) mounted thereon, on the rear portion of the trailing pad 180 close to the trailing-edge surface 122 of the slider 525. The trailing pad 180 has a media-facing surface at the first level 142.

As shown in FIGS. 3A and 3B, the slider 525 also includes a segmented front bar 130 and at least one cavity 170 abutting the segmented front bar 130. In the example slider 525, the at least one cavity 170 has a floor that is at the fourth level 148. As shown in FIGS. 3A and 3B, the at least one cavity 170 may be open to the first side-edge surface 123 and/or the second side-edge surface 124.

The at least one cavity 170 is situated between the segmented front bar 130 and the leading pad 220. The at least one cavity 170 is separated from the leading pad 220 by a shallow-etch surface 222 of the slider 525. The shallow-etch surface 222, which is at the second level 144, abuts the at least one cavity 170 and the leading pad 220. In the example of FIGS. 3A and 3B, the shallow-etch surface 222 is substantially perpendicular to the leading-edge surface 121 and the cavity-facing surface 134 of the segmented front bar 130, described further below.

The segmented front bar 130 is configured to be a barrier to particles so that they do not pass the leading-edge surface 121 of the slider 525. The segmented front bar 130 comprises the leading-edge surface 121, a segmented media-facing surface 132, and a cavity-facing surface 134. The segmented media-facing surface 132 comprises a plurality of non-recessed portions 136, which are at the first level 142, and a plurality of recessed portions 138, which are at the second level 144. The recessed portions 138 are the floors of a plurality of slots 137 in the segmented front bar 130. The recessed portions 138 are at the second level 144. Thus, the recessed portions 138 (and the floors of the slots 137) are at a maximum depth, relative to the first level 142, that is less than the depth of the at least one cavity 170, also relative to the first level 142. The maximum depth of the slots 137, relative to the first level 142, may be, for example, between approximately 100 nm and approximately 1000 nm.

In the example slider 525 shown in FIGS. 3A and 3B, the surfaces of the recessed portions 138 of the slots 137 are substantially perpendicular to the leading-edge surface 121, but this is not a requirement. In the example shown in FIGS. 3A and 3B, the slots 137 have sides that are substantially vertical, but it is to be appreciated that the slots 137 can have other shapes, and the sides need not be vertical.

The slots 137 can have any suitable widths (along the leading-edge surface 121) to provide some or all of the benefits described herein. The slots 137 should have narrow enough widths to prevent particles from passing through. For example, the slots 137 may have widths between about 10 microns and about 20 microns. All of the slots 137 can have the same width, or different slots 137 may have different widths. It will be appreciated that the width(s) of the slots 137 along the leading-edge surface 121 may depend on manufacturing capabilities.

Additionally, in the example of FIGS. 3A and 3B, the slots 137 are all substantially identical (and the recessed portions 138 are all substantially the same size and are at substantially the same depth), but it is to be appreciated that different slots 137 can have different sizes, shapes, depths, etc.

Furthermore, the depths of the slots 137 shown in FIGS. 3A and 3B are at the same level as the shallow-etch surface 222, but it is to be appreciated that the slots 137 may have a maximum depth that is deeper or shallower than the second level 144 and/or the recess distance of the shallow-etch surface 222 from the media-facing surface of the leading pad 220.

The segmented media-facing surface 132 may include any suitable number of non-recessed portions 136 and the corresponding number of recessed portions 138 (and slots 137). There may be one more non-recessed portions 136 than recessed portions 138, or vice versa, or the segmented media-facing surface 132 may have the same number of non-recessed portions 136 and recessed portions 138. The number of non-recessed portions 136 and recessed portions 138 may depend, for example, on manufacturing capabilities. For example, the number of non-recessed portions 136 may be between about 6 and about 40, and the number of recessed portions 138 may be between about 5 and about 41. The distance between adjacent slots 137 may be, for example, between about 10 microns and about 100 microns.

The segmented front bar 130 may have any suitable thickness (e.g., the dimension in the direction perpendicular to the leading-edge surface 121). For example, the thickness may be between approximately 10 microns and approximately 50 microns. It will be appreciated by those having ordinary skill in the art that the thickness of the segmented front bar 130 may depend on manufacturing capabilities.

Experimental results indicate that the segmented front bar 130 decreases the probability that the recording medium 520 will be scratched due to particles. For example, one set of experiments demonstrated that relative to a slider without a segmented front bar 130, the scratch probability with a slider 525 with a segmented front bar 130 decreased by more than 50% for hard particles (e.g., alumina), and for soft particles, the scratch rate decreased by more than 75% when the segmented front bar 130 was included in the slider 525.

Figure 4A:
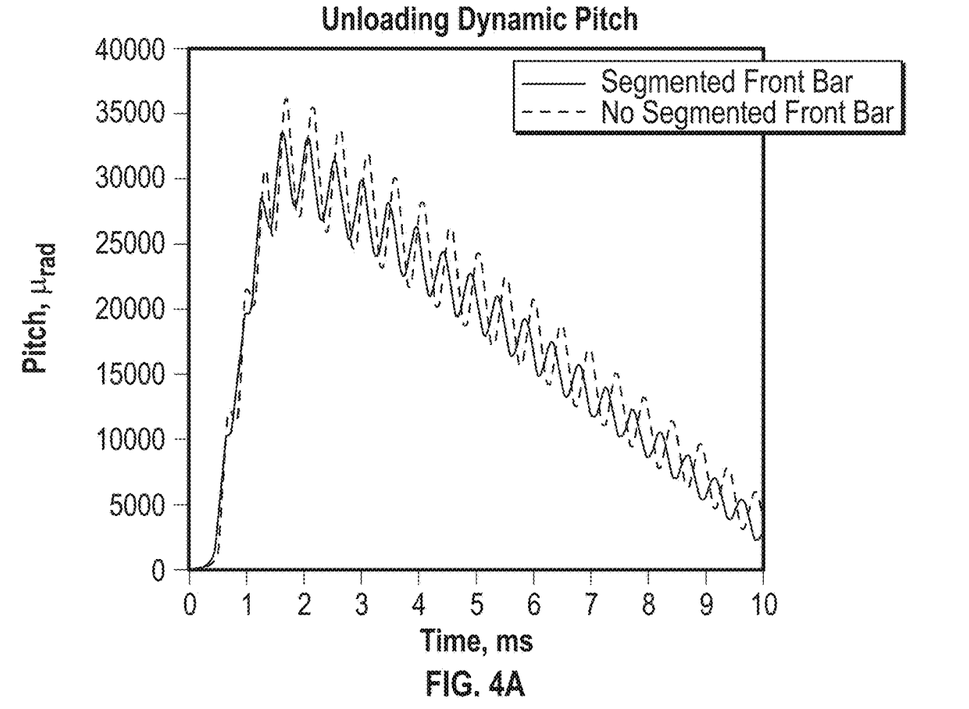
FIG. 4A is a plot of a simulation of the unloading dynamic pitch of a slider without and with an embodiment of the segmented front bar in accordance with some embodiments.

Another benefit of the segmented front bar 130 is in dynamic performance of the slider 525. FIG. 4A is a plot of a simulation of the unloading dynamic pitch of a slider 525 without and with an embodiment of the segmented front bar 130. As indicated by FIG. 4A, the magnitude of vibrations and oscillation excursions are both reduced when the segmented front bar 130 is included in the slider 525. Thus, the slider 525 pitches less during unloading when the segmented front bar 130 is included.

Figure 4B:
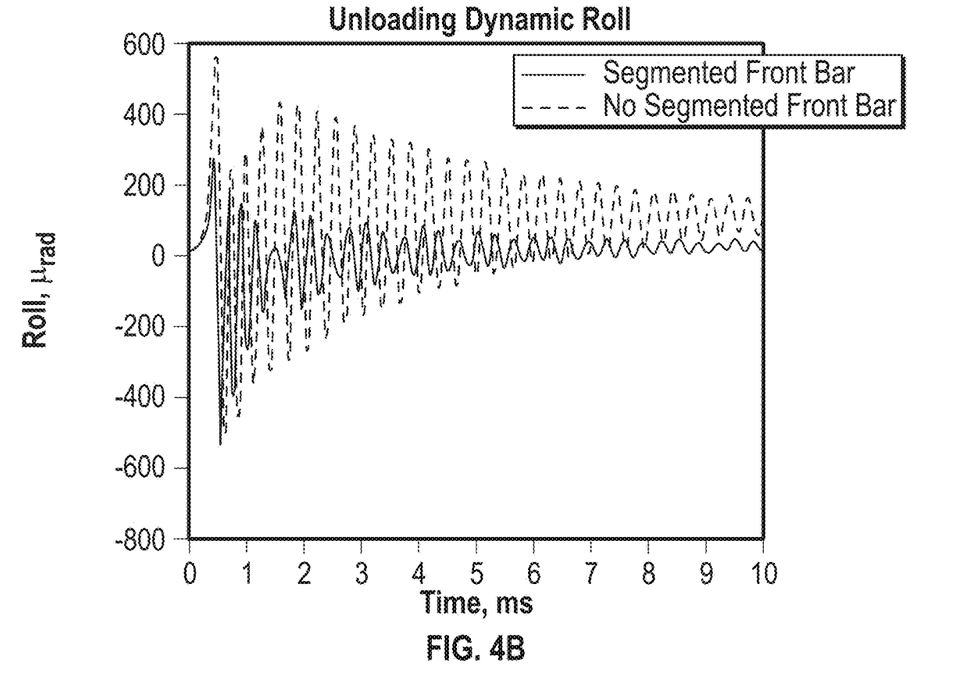
FIG. 4B is a plot of a simulation of the unloading dynamic roll of a slider without and with an embodiment of the segmented front bar in accordance with some embodiments.

FIG. 4B is a plot of a simulation of the unloading dynamic roll of a slider 525 without and with an embodiment of the segmented front bar 130. As indicated by FIG. 4B, dynamic roll is significantly improved for the slider 525 with the segmented front bar 130 as compared to when the slider does not have the segmented front bar 130. Both the maximum roll and the oscillation excursions are reduced when the segmented front bar 130 is included in the slider 525. Thus, FIGS. 4A and 4B illustrate that when the segmented front bar 130 is included in a slider 525, the dynamic performance improves relative to a slider that does not include the segmented front bar 130.

The slider 525 can be fabricated from a wafer using a photolithography process having two fundamental steps: (a) covering a portion of a surface of the wafer (e.g., using a photoresist mask), and (b) removing substrate material from the exposed (e.g., not covered by the mask) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the recording medium 520 when the slider 525 is used in a data storage device 500, i.e., the ABS 150.

The steps (a) and (b) may be repeated multiple times to create different features of the slider 525. The following discussion focuses on the ABS 150 features near the leading-edge surface 121, but it will be appreciated that the other features of the ABS 150 can also be fabricated during the described steps or during other steps of the slider 525 manufacturing process that are known in the art.

In some embodiments, a first application of the step (a) covers (e.g., using a mask) the surface 142 and other features of the ABS 150 that remain at the same level as the surface 142 in the finished slider 525. While the mask is in place, the first application of step (b) may use shallow ion milling to remove material to create the surface 144. That mask can then be removed. A different mask can then be applied, and the steps (a) and (b) repeated to create features that are recessed further from the top-most surface of the ABS 150 (e.g., recessed from the surface 142).

Figure 5:
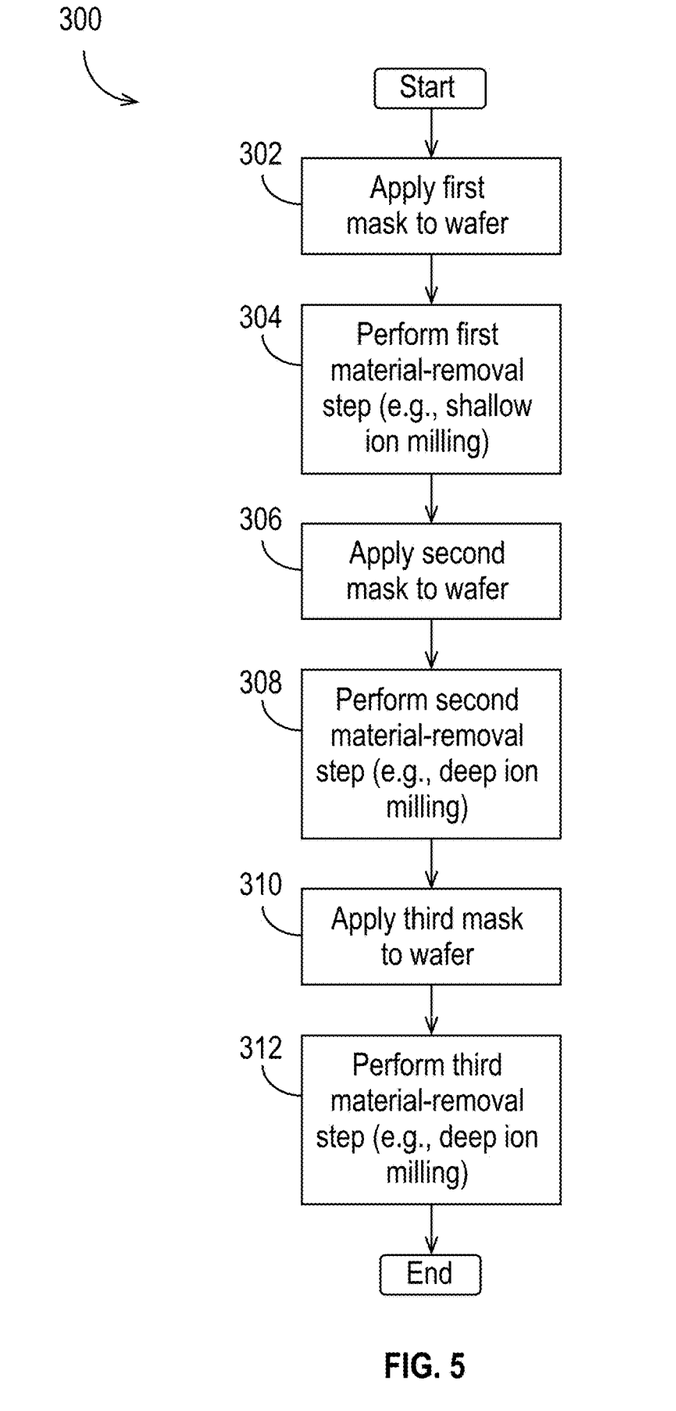
FIG. 5 is a flow diagram illustrating a portion of an example method that can be used to manufacture a slider with a segmented front bar in accordance with some embodiments.

FIG. 5 is a flow diagram illustrating a portion of an example method 300 that can be used to manufacture a slider 525 with a segmented front bar 130 in accordance with some embodiments. The slider 525 fabrication process can include additional steps that are known in the art but that are not shown in FIG. 5. These additional steps may be performed before, between, and/or after the steps illustrated in FIG. 5. The description of the method 300 focuses only the steps of the method 300 related to creating the segmented front bar 130, but it is to be appreciated that other features of the slider 525 can also be created during these steps.

At block 302, a first mask is applied to the wafer. The first mask includes a region that protects where the leading pad 220 and the non-recessed portions 136 of the segmented front bar 130 will be situated in the finished slider 525. The first mask does not protect where the slots 137 (and, therefore, the recessed portions 138), the at least one cavity 170, and the shallow-etch surface 222 will be situated.

At block 304, a first material-removal step is performed to remove material from the wafer. The first material-removal step may use, for example, shallow ion milling. At least a portion of the leading pad 220 and at least a portion of the segmented front bar 130 may be apparent in the slider 525 after block 304 is complete. After completion of block 304, media-facing surfaces at the first level 142 and the second level 144 may be visible.

After completion of block 304, and potentially additional intervening manufacturing steps, at block 306, a second mask is applied to the wafer. The second mask covers the segmented front bar 130, the leading pad 220, and the shallow-etch surface 222. The second mask does not cover where the at least one cavity 170 will be situated in the finished slider 525.

At block 308, a second material-removal step is performed to remove additional material from the wafer, including at least some of the material from the location(s) where the at least one cavity 170 will be. The second material-removal step may use, for example, deep ion milling. After completion of block 308, media-facing surfaces at the third level 146 may be visible.

After completion of block 308, and potentially additional intervening manufacturing steps, at block 310, a third mask is applied to the wafer. The third mask covers the segmented front bar 130, the leading pad 220, and the shallow-etch surface 222, and media-facing surfaces at the 146. The third mask does not cover where the at least one cavity 170 will be situated in the finished slider 525.

At block 312, a third material-removal step is performed to remove additional material from the wafer, including at least some of the remaining material from the location(s) where the at least one cavity 170 will be. The third material-removal step may use, for example, deep ion milling. After completion of block 312, media-facing surfaces at the fourth level 148 may be visible.

It is to be appreciated that the method 300 described above can be used to create slider 525 with the four levels (e.g., first level 142, second level 144, third level 146, and fourth level 148). The manufacturing process can include more or fewer steps to create fewer or more levels of the ABS 150.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As an example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A slider, comprising:
  a plurality of media-facing surfaces at a plurality of levels, the plurality of levels including a first level, a second level, and a third level, wherein, in an orientation in which the plurality of media-facing surfaces is oriented upward, the first level is above the second level, and the second level is above the third level;

a segmented front bar comprising a leading-edge surface, a segmented media-facing surface, and a cavity-facing surface; and at least one cavity abutting the segmented front bar and situated between the cavity-facing surface of the segmented front bar and a leading pad, wherein:

the segmented media-facing surface comprises a plurality of non-recessed portions at the first level and a plurality of recessed portions at the second level, a floor of the at least one cavity is at the third level, and a number of the plurality of non-recessed portions is between about 6 and about 40.

2. The slider recited in claim 1, wherein:

the second level is recessed from the first level by between approximately 100 nm and approximately 1000 nm, and the third level is recessed from the first level by between approximately 2000 nm and approximately 4000 nm.

3. The slider recited in claim 1, wherein a number of the plurality of recessed portions is between about 5 and about 41.

4. The slider recited in claim 1, further comprising:

a shallow-etch surface adjacent to the at least one cavity, wherein the shallow-etch surface is substantially perpendicular to the leading-edge surface and is at the second level.

5. A data storage device comprising:

a recording media; and the slider recited in claim 1.

6. A method of manufacturing the slider recited in claim 1, the method comprising:

applying a first mask to a wafer, the first mask protecting a first plurality of locations corresponding to the plurality of non-recessed portions and not protecting (a) a second plurality of locations corresponding to the plurality of recessed portions, and (b) at least one location corresponding to the at least one cavity;

removing material from the second plurality of locations corresponding to the plurality of recessed portions and from the at least one location corresponding to the at least one cavity;

applying a second mask to the wafer, the second mask protecting the plurality of non-recessed portions and the plurality of recessed portions and not protecting the at least one location corresponding to the at least one cavity; and removing additional material from the at least one location corresponding to the at least one cavity.

7. The method recited in claim 6, wherein:

removing material from the second plurality of locations corresponding to the plurality of recessed portions and from the at least one location corresponding to the at least one cavity comprises performing shallow ion milling; and removing additional material from the at least one location corresponding to the at least one cavity comprises performing deep ion milling.

8. A slider, comprising:

a plurality of media-facing surfaces at a plurality of levels, the plurality of levels including a first level, a second level, and a third level, wherein, in an orientation in which the plurality of media-facing surfaces is oriented upward, the first level is above the second level, and the second level is above the third level;

a segmented front bar comprising a leading-edge surface, a segmented media-facing surface, and a cavity-facing surface;

at least one cavity abutting the segmented front bar and situated between the cavity-facing surface of the segmented front bar and a leading pad;

a first side-edge surface substantially perpendicular to the leading-edge surface; and a second side-edge surface substantially parallel to the first side-edge surface, wherein:

the segmented media-facing surface comprises a plurality of non-recessed portions at the first level and a plurality of recessed portions at the second level, and a floor of the at least one cavity is at the third level, and wherein the at least one cavity comprises:

a first cavity open to the first side-edge surface, and a second cavity open to the second side-edge surface.

9. A slider, comprising:

a plurality of media-facing surfaces at a plurality of levels, the plurality of levels including a first level, a second level, and a third level, wherein, in an orientation in which the plurality of media-facing surfaces is oriented upward, the first level is above the second level, and the second level is above the third level;

a segmented front bar comprising a leading-edge surface, a segmented media-facing surface, and a cavity-facing surface; and at least one cavity abutting the segmented front bar and situated between the cavity-facing surface of the segmented front bar and a leading pad, wherein the segmented media-facing surface comprises a plurality of non-recessed portions at the first level and a plurality of recessed portions at the second level, a floor of the at least one cavity is at the third level, and a thickness of the segmented front bar in a direction substantially perpendicular to the leading-edge surface is between approximately 10 microns and approximately 50 microns.

10. A slider, comprising:

a segmented front bar comprising a plurality of slots, wherein a front surface of the segmented front bar is a leading-edge surface of the slider, and wherein the plurality of slots is situated substantially perpendicular to the leading-edge surface of the slider;

a leading pad situated between the leading-edge surface of the slider and a trailing edge of the slider, wherein the leading pad is recessed from the segmented front bar;

a cavity abutting the segmented front bar and situated between the segmented front bar and the leading pad; and a shallow-etch surface situated between the cavity and the leading pad, wherein a maximum depth of the plurality of slots, relative to a non-recessed surface of the segmented front bar, is less than a depth of the cavity relative to the non-recessed surface of the segmented front bar.

11. The slider recited in claim 10, wherein all of the plurality of slots are substantially identical.

12. The slider recited in claim 10, wherein a distance between adjacent slots is between approximately 10 microns and approximately 100 microns.

13. The slider recited in claim 10, wherein, the maximum depth of the plurality of slots, relative to a media-facing surface of the segmented front bar, is substantially identical to a recess distance of the shallow-etch surface relative to a media-facing surface of the leading pad.

14. The slider recited in claim 10, wherein, relative to a media-facing surface of the segmented front bar, the maximum depth of the plurality of slots is between approximately 100 nm and approximately 1000 nm.

15. The slider recited in claim 14, wherein, relative to the media-facing surface of the segmented front bar, the depth of the cavity is between approximately 2000 nm and approximately 4000 nm.

16. The slider recited in claim 10, wherein a thickness of the segmented front bar in a direction substantially perpendicular to the leading-edge surface of the slider is between approximately 10 microns and approximately 50 microns.

17. A data storage device comprising:
   a recording media; and
   the slider recited in claim 10.

18. A method of manufacturing the slider recited in claim 10, the method comprising:
   applying a first mask to a wafer, the first mask not protecting (a) a plurality of locations corresponding to the plurality of slots, (b) at least one location corresponding to the cavity, and (c) an area corresponding to the shallow-etch surface;
   removing material from the plurality of locations corresponding to the plurality of slots, from the at least one location corresponding to the cavity, and from the area corresponding to the shallow-etch surface;
   applying a second mask to the wafer, the second mask protecting the plurality of locations corresponding to the plurality of slots and the area corresponding to the shallow-etch surface, and not protecting the at least one location corresponding to the cavity; and
   removing additional material from the at least one location corresponding to the cavity.

19. The method recited in claim 18, wherein:
   removing material from the plurality of locations corresponding to the plurality of slots, from the at least one location corresponding to the cavity, and from the area corresponding to the shallow-etch surface comprises performing shallow ion milling; and
   removing additional material from the at least one location corresponding to the cavity comprises performing deep ion milling.

\* \* \* \* \*